United States Patent [19]
Han

[11] Patent Number: 5,445,214
[45] Date of Patent: Aug. 29, 1995

[54] COOLING/HEATING AIR CONDITIONER AND CONTROL CIRCUIT THEREOF

[75] Inventor: Guen-Pil Han, Suwon, Rep. of Korea

[73] Assignee: Samsung Electronics Co., Ltd., Suwon, Rep. of Korea

[21] Appl. No.: 57,850

[22] Filed: May 7, 1993

[30] Foreign Application Priority Data

May 7, 1992 [KR] Rep. of Korea .............. 92,7737
Jul. 8, 1992 [KR] Rep. of Korea ....... UM92 12523 U

[51] Int. Cl.6 .............................................. F25B 29/00
[52] U.S. Cl. ................................... 165/11.1; 165/19; 165/60; 165/86; 165/96
[58] Field of Search .................. 165/11.1, 13, 19, 20, 165/21, 60, 86, 96

[56] References Cited

U.S. PATENT DOCUMENTS

| | | | |
|---|---|---|---|
| 2,310,086 | 2/1943 | Howard | 165/86 |
| 4,284,128 | 8/1981 | Nelson | 165/60 |
| 4,520,864 | 6/1985 | Katagiri | 165/60 |
| 4,627,568 | 12/1986 | Lortie | 165/19 |
| 4,745,963 | 5/1988 | Assaf | 165/60 |
| 4,750,545 | 6/1988 | Hile | 165/60 |
| 4,931,626 | 6/1990 | Shikama | 165/96 |
| 5,341,868 | 8/1994 | Nakata | 165/11.1 |

FOREIGN PATENT DOCUMENTS 2-195122 8/1990 Japan.

*Primary Examiner*—Ira S. Lazarus
*Assistant Examiner*—Daniel J. O'Connor
*Attorney, Agent, or Firm*—Burns, Doane, Swecker & Mathis

[57] ABSTRACT

An air conditioner includes a fan for forcing air through an air path. An endless belt filter travels through a water tank and across the air path to exchange heat with air passing through the belt filter. A heater is provided for selectively heating the water. A moisture collecting filter disposed in the air path downstream of the belt filter removes moisture from the air. Sensors detect the volume and temperature of the water in the tank for actuating either or both of the heater and a warning buzzer. A speaker is mounted in the air conditioner housing and is connectible to a radio. A switching circuit causes radio sound from the speaker to be muted and instead causes the speaker to emit the warning buzzer when the latter is activated by a sensor.

14 Claims, 6 Drawing Sheets

COOLING/HEATING AIR CONDITIONER AND CONTROL CIRCUIT THEREOF

BACKGROUND OF THE INVENTION

1. Field of the Invention

The present invention relates to a cooling/heating air conditioner in which air passes through a moistened filter belt to exchange heat therewith.

2. Description of the Prior Art

Generally, an air conditioner for discharging inducted room air through a heat exchange by use of water temperature is disclosed in a Japanese laid open patent application No. Hei 2-195122, in which, as illustrated in FIG. 1, a water tank 2 for storing water is installed on a lower side of a main frame of the air conditioner 1 and a driven axis 3 is dipped in the water tank 2, so that the driven axis 3 can be interlocked with a driving axis rotated by a driving force from a driving motor (not shown) mounted on an upper side of the air conditioner through a heat exchange filter 5.

Meanwhile, a suction intake 1a for sucking in the room air is formed on a rear side of the main frame 1 of the air conditioner and a guide bracket 6 is fixedly attached on external upper and lower sides of the suction intake 1a, between which an air filter 7 is installed for filtering dusts floating in the room air when the room air is sucked into the main frame 1 through the suction intake 1a.

A fan 8 is installed on a central front (not shown) in the main frame 1, so that the room air can be rotatively sucked in one direction by a driving force from a fan motor (not shown) and at the same time cool and warm air is filtered by the heat exchange filter 5 can be discharged.

First and second guide plates 9 and 10 for guiding the cool and warm airs are disposed on lower and upper areas of the fan 8. A heater (not shown) selectively heats the water in the tank.

Furthermore, a dischange grille 11 is mounted on an upper side against a frontal panel 12 of the main frame 1, that is, between the first guide plate 9 and second guide plate 10 to thereby induce filtered warm/cool air currents, and an operating means 23 for controlling an operation of the air conditioner is disposed in the middle of the frontal panel 12.

In the operating control circuit of the conventional air conditioner thus constructed, as illustrated in FIG. 2, an AC/DC converting unit 21 converts an AC power source to a DC power source to thereby be inputted to respective power input terminals of a system controller 22, an operating means 23, a fan motor drive control means 24, and a heat exchange filter driving means 25. The system controller 22 takes as an input a data selected from the operating means 23, and according to the data thereof, the system controller 22 is connectively constructed to control the fan motor drive control means 24, heat exchange filter driving means 25 and water heater driving means 26.

An operation of a cooling/heating air conditioner employing a control circuit thus described is determined by a selection of functional switches respectively installed on the operating means 23.

In other words, if one of the switches installed on the operating means 23 as high, medium and low wind quanity switches is selected, a data thereof is inputted to an input port I1 of the system controller 22, and according to the inputted data, the system controller 22 performs an internally-stored program to thereby supply a control signal corresponding to a result thereof to the drive control means 24 through an output port 01.

Under the above state or initialization state, when a user selects the cool air switch installed on the operating means 23, a data corresponding thereof is inputted to the input port I1 of the system controller 22, and subsequently, the system controller 22 which has performed the internally-stored program outputs to the output ports 01 and o2 of a predetermined control signal.

Therefore, because the fan motor drive control means 24 and heat exchange filter driving means 25 are activated, the room air is sucked in to thereafter be heat-exchanged to cool air and be discharged to the room.

Meanwhile, when the user selects a warm air switch a data corresponding thereof is inputted to the system controller 22, and subsequently, the system controller which has performed the internally-stored program outputs to output ports 01, 02 and 03 a predetermined control signal.

In other words, the control signal outputted to the output port 01 of the system controller 22 is supplied to the fan motor drive control means 24 to thereby operate the fan motor, as described in the foregoing.

The control signal outputted from the output port 02 is supplied to the heat exchange filter driving means 25 to thereby operate the heat exchange filter.

The control signal outputted from the output port 03 is supplied to the heat driving means 26 to thereby operate the heater. Accordingly, the sucked-in room air is changed to the warm air by the heat exchange filter to thereby be heat-exchanged, so that the warm can be discharged into the room.

The cooling/heating air conditioner employing the control circuit thus operated can not control a room humidity according to changes of the seasons because a near constant humidity is mixed in the air to thereby be discharged when the sucked-in room air is changed to the cool or warm airs through the heat exchanger.

Furthermore, because the heater is kept activated during the warm air operation, a water temperature ( the water temperature in a water tank) can not be maintained constantly and the water quantity remaining in the water tank can not be measured.

SUMMARY OF THE INVENTION

Accordingly, the present invention has been presented to solve the problems thus described and therefor it is an object of the present invention to provide a cooling/heating air conditioner which can change humid cool and warm airs to thereby discharge agreeable cool and warm airs.

It is another object of the present invention to provide a control circuit of a cooling/heating air conditioner which can control operations of a heat exchange filter, fan, moisture collecting filter, heater and the like in accordance with an operational selection of the system to thereby control a room humidity and to maintain a water temperature within the air conditioner on an optimum level, so that an agreeable and comfortable cooling and heating functions can be performed.

In accordance with one aspect of the present invention, there is provided a cooling/heating air conditioner by which sucked-in room air is heat-exchanged to thereby be discharged in cool/warm airs, the air conditioner comprising: a water tank mounted on a lower side of the main frame of the air conditioner; a heat exchange filter for heat-exchanging the sucked-in air into cool/warm airs by utilizing the water temperature in the water tank; and a moisture collecting filter for removing moisture contained in the room air heat-exchanged by the heat exchange filter.

In accordance with another aspect of the present invention, there is provided a control circuit for a cooling/heating air conditioner, comprising: an operating means for selecting an operational direction of a system; a system controller for controlling overall peripheral equipment in accordance with a data outputted from the operating means; a fan motor driving means for driving the fan motor in accordance with a control signla outputted from the system controller; a heat exchange filter driving means for driving the heat exchange filter in order to heat-exchange the sucked-in room air to cool/-warm airs when the fan motor driving means is operated; and a moisture collecting filter actuating means for driving the moisture collecting filter in order to control the moisture of the heat-exchanged room air when the heat exchange filter driving means is operated.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

A preferred embodiment of the present invention will now be described in detail with reference to the accompanying drawings.

Figure 1:
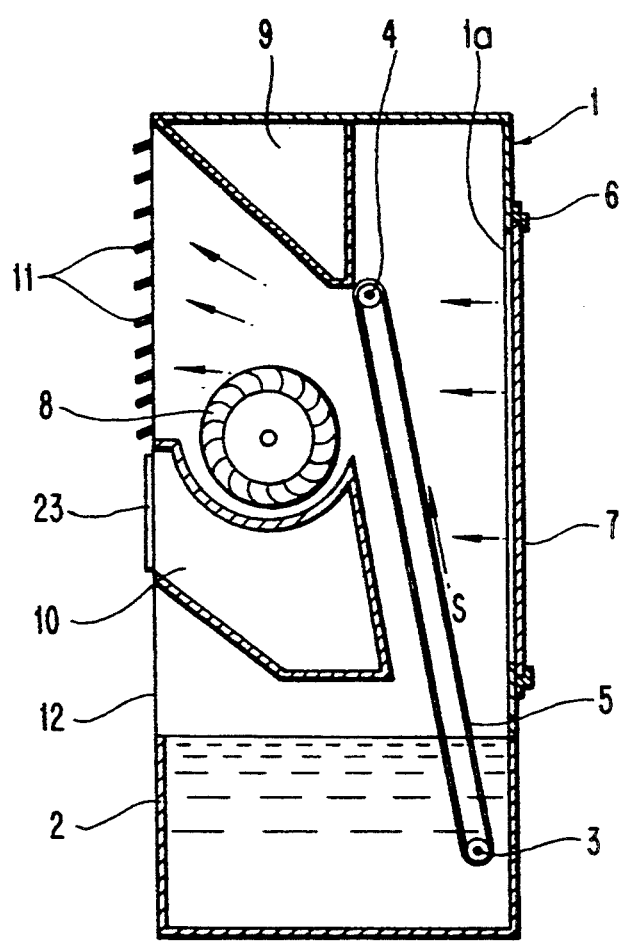
FIG. 1 is a cross sectional view of a conventional cooling/heating air conditioner.
Figure 2:
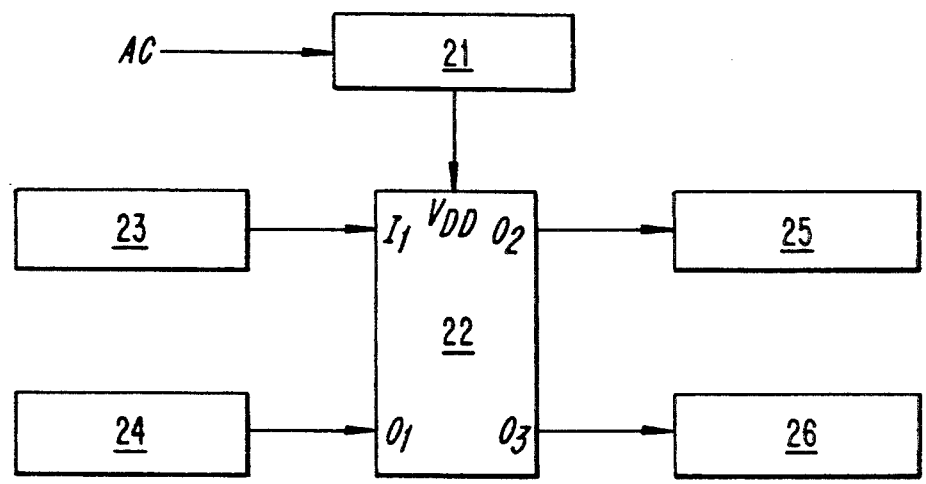
FIG. 2 is a block diagram of a control circuit employed to the air conditioner illustrated in FIG. 1.
Figure 3:
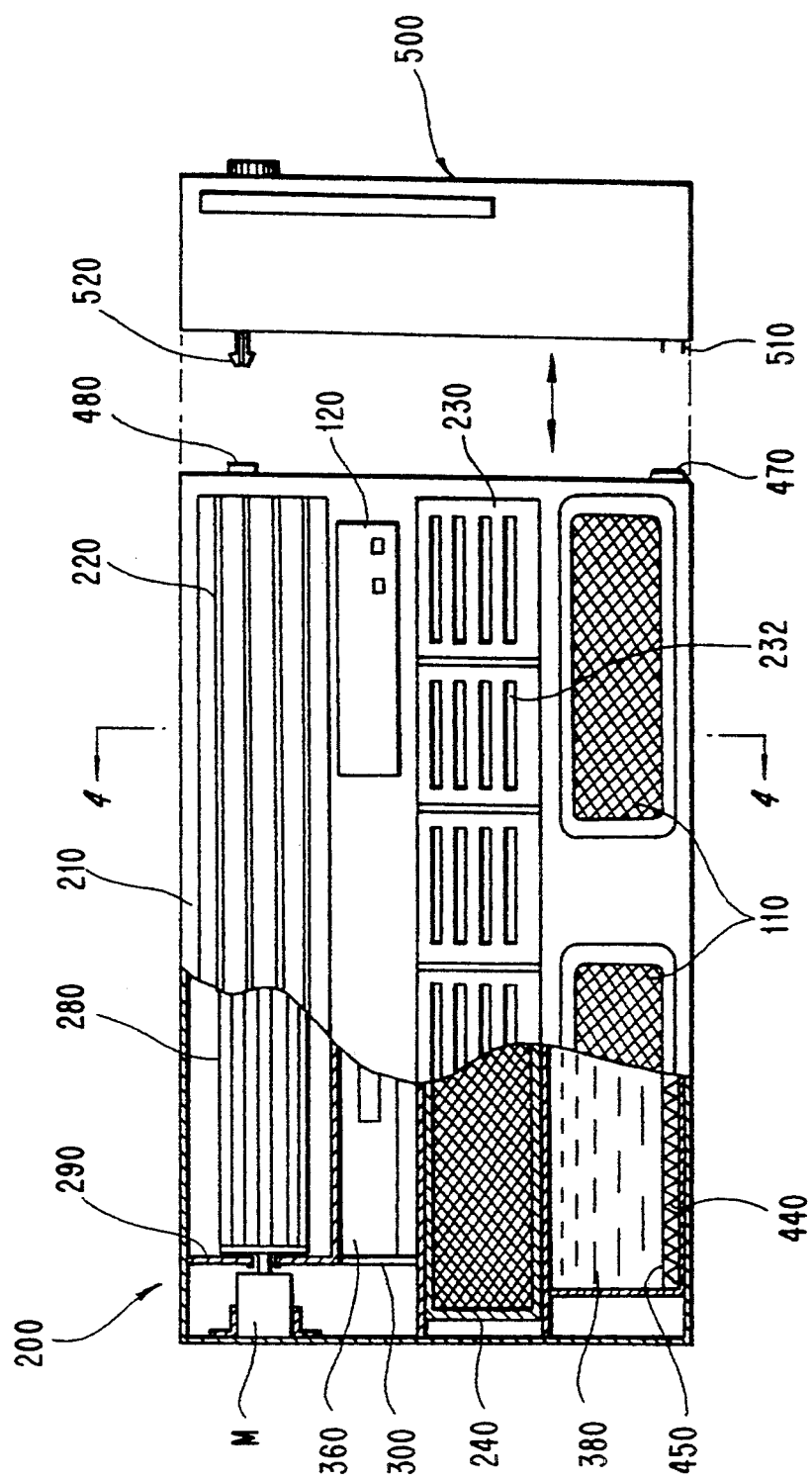
FIG. 3 is a front of view a cooling/heating air conditioner produced in accordance with the present invention with a portion of a front wall thereof broken away.
Figure 4:
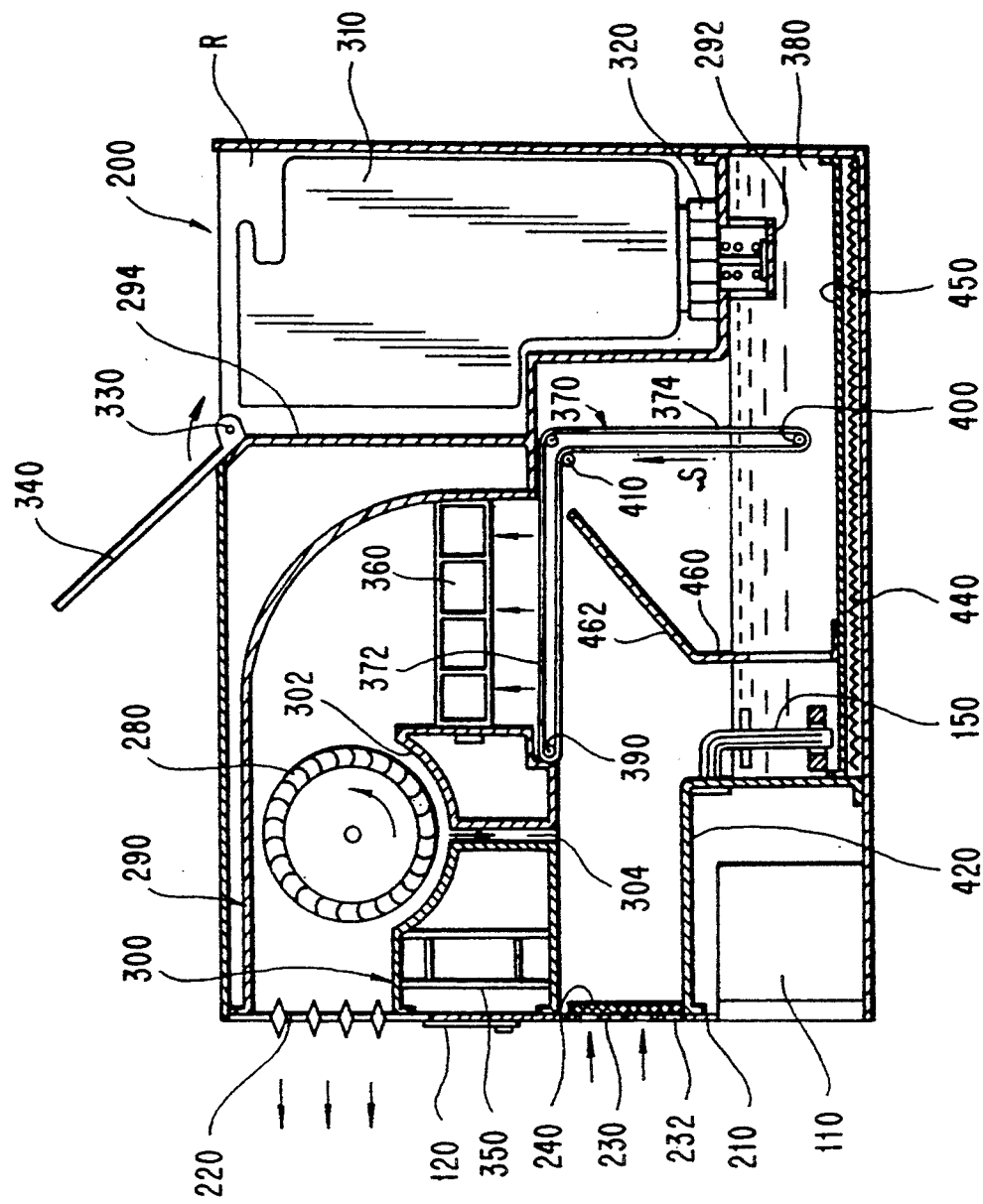
FIG. 4 is a cross sectional view taken along line 4—4 in FIG. 3.

In FIGS. 3 and 4, on an upper side of a frontal panel 210 for the main frame 200 of the air conditioner there is disposed a discharge grille unit 220 for controlling a wind direction in up/down and left/right directions, discharging the heat-exchanged cool/warm airs to the outside. On a center of the frontal panel 210 there is disposed a suction grille unit 230 formed with a plurality of holes 232 for sucking in the room air. On a rear side of the suction grille unit 230 there is provided an air filter 240 in order to filter the dust and the like floating in the air.

Meanwhile, on the right side of the frontal panel aganist a space between the discharge grille unit 220 and suction grille unit 230, there is disposed an operational means 120 for controlling an operation of the air conditioner. On a lower side of the suction grille unit 230, in other words, on the lower side of the frontal panel 210, there is disposed a couple of speakers 110 internally mounted within the main frame of the air conditioner and exposed on the front.

Furthermore, on a rear side where the discharge grille unit 220 is installed against an interior of the main frame 200 of the air conditioner, there is disposed a fan 280 which receives a driving power from a fan motor 280 installed on one end within the main frame of the air conditioner through a bracket (reference numeral not designated) to thereby rotate, so that the room air is sucked in through the suction grille unit 230 and the cool/warm airs heat-exchanged by the heat exchange filter (explained later) and moisture collecting filter can be discharged to the outside through the discharge grille unit 220.

On upper and lower sides of the fan 280 there are disposed first and second guide plates 290 and 300 for guiding the room air passed through the suction grille unit 230 to the discharge grill unit 220.

In other words, the first guide plate 290 encompasses the upper and rear sides of the fan 280 in a predetermined spacing, with its lower side portion bent in multiple stages (steps) in order for a detachable water canteen 310 to sit tightly through the upper side against the rear side within the main frame of the air conditioner, so that a cup shaped water saucer 292 disposed on an extreme lower step of the plate 290 can receive a valve stem of a valve apparatus 320 of a water intake installed on the detachable water canteen 310.

Furthermore, from a central step of the plate 290 there projects upwardly a vertical unit 294 which together with a rear side of the mainframe, forms a canteen-receiving space R.

On an upper end of the vertical unit 294 a door 340 is disposed for a rotatable opening and closing through a hinge 330 in order for the detachable water canteen 310 accommodated on the spacing R of the main frame 200 of the air conditioner to be detached and installed.

Meanwhile, the second guide plate 300 is installed on a rear surface of the frontal panel 210 of the discharge grille unit 220 and suction grille unit 230, and on an upper surface thereof, there is provided a circular concave unit 302 into which the lower portion of the fan can be inserted.

On the center of the circular concave unit 302 there is provided a drain groove unit 304 through which water drops clinging to the fan 280 can be collected on the circular concave unit 302 to thereby be retrieved in a water tank 380 mounted on a lower side of the main frame 200 of the air conditioner.

A printed circuit board PCB 350 plate is installed on the second guide plate 300 so that the PCB 350 plate can control the air conditioner by being electrically connected to the operating means 120 via an electric wire (not shown).

On a middle portion of a vertical passage formed by a joining of the first guide plate 290 and the second guide plate 300 there is provided a moisture collecting filter 360 intended to change the heat-exchanged humid cool/warm airs to agreeable cool/warm airs, and the moisture collecting filter 360 is made to be controlled (on or off) by the operating means 120.

Meanwhile, space below the lower surface of the moisture collecting filter 360, there is provided a heat exchange filter 370 in the form of an endless rotary belt having a vertical unit 374 with a portion thereof dipped in the water tank 380 and a horizontal unit 372. Room air which is sucked in and passes through a lower area of the vertical passage formed between the first guide 290 and second guide plate 300 can be changed to cool/warm airs.

In other words, one end of the heat exchange filter 370 is supported to a lower side of the second guide plate 300 by a driving axis 390 rotated by a driving force received from a driving motor (not shown) while the other end of the heat exchange fiter 370 is supported by a driven axis 400 dipped in the water tank 380 and a central portion of the filter 370 is supported by a couple of idle axes 410 to thereby comprise the horizontal unit 372 and the vertical unit 374.

Meanwhile, behind two radio speakers 110 installed within the main frame 200 of the air conditioner there is provided a bent third guide plate 420. The water tank 380 is situated between the thrid guide plate 420 and the rear side surface of the main frame 200 of the air conditioner.

Furthermore, on a vertical rear surface of the third guide plate 420 there is provided a water quantity detecting means 155, by way of example, a buoy for detecting a water storage capacity stored in the water tank 380.

Meanwhile, on a lower surface formed with the water tank 380 against the lower side of the main frame 200 of the air conditioner, there is fixedly attached a heater cover 450 to a predetermined elevation, and a heater 440 is disposed between the heater cover 450 and the lower surface of the main frame 200 of the air conditioner, so that the water stored in the water tank 3890 can be heated to thereby provide warm airs.

In other words, as the heater cover 450 comprising the lower surface of the water tank 380 is heated by a generation of heat from the heater 440, the water stored on the upper surface of the heater cover 450 is heated, so that a hot water necessary for producing warm airs can be provided.

At this moment, on the upper surface of the heater cover 450 there is provided a fourth guide plate 460 having a slant 462 on the upper side in order for the room air sucked in through the suction grille unit 230 to be guided to the end vertical passage formed by the first and second guide plates 290 and 300.

Furthermore, on a lower side facing one end of the main frame 200 of the air conditioner there is disposed a socket 470 to be connected to a terminal of a speaker 110 installed within the main frame 200 of the air conditioner in order for a detachable radio 500 to be connected, and a fixed groove 480 is formed on the upper side.

At this moment, on the detatable radio 500, a plug 510 connectable to the socket 470 is disposed on the lower side, and on the upper side a fixed lug 520 is resiliently connectible to the fixed groove 480.

Figure 5:
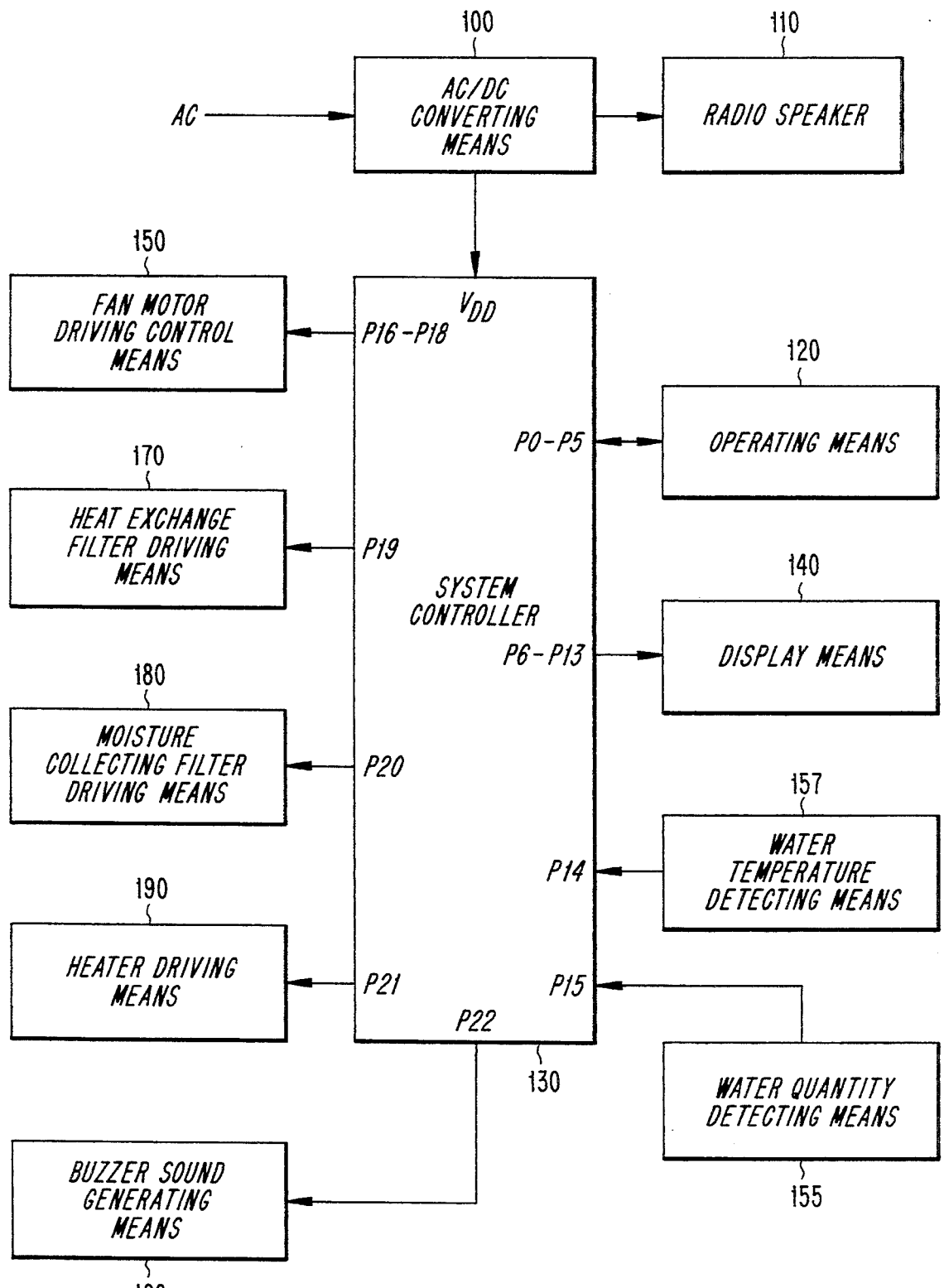
FIG. 5 is a block diagram of a cooling/heating air conditioner control circuit in accordance with the present invention.
Figure 6:
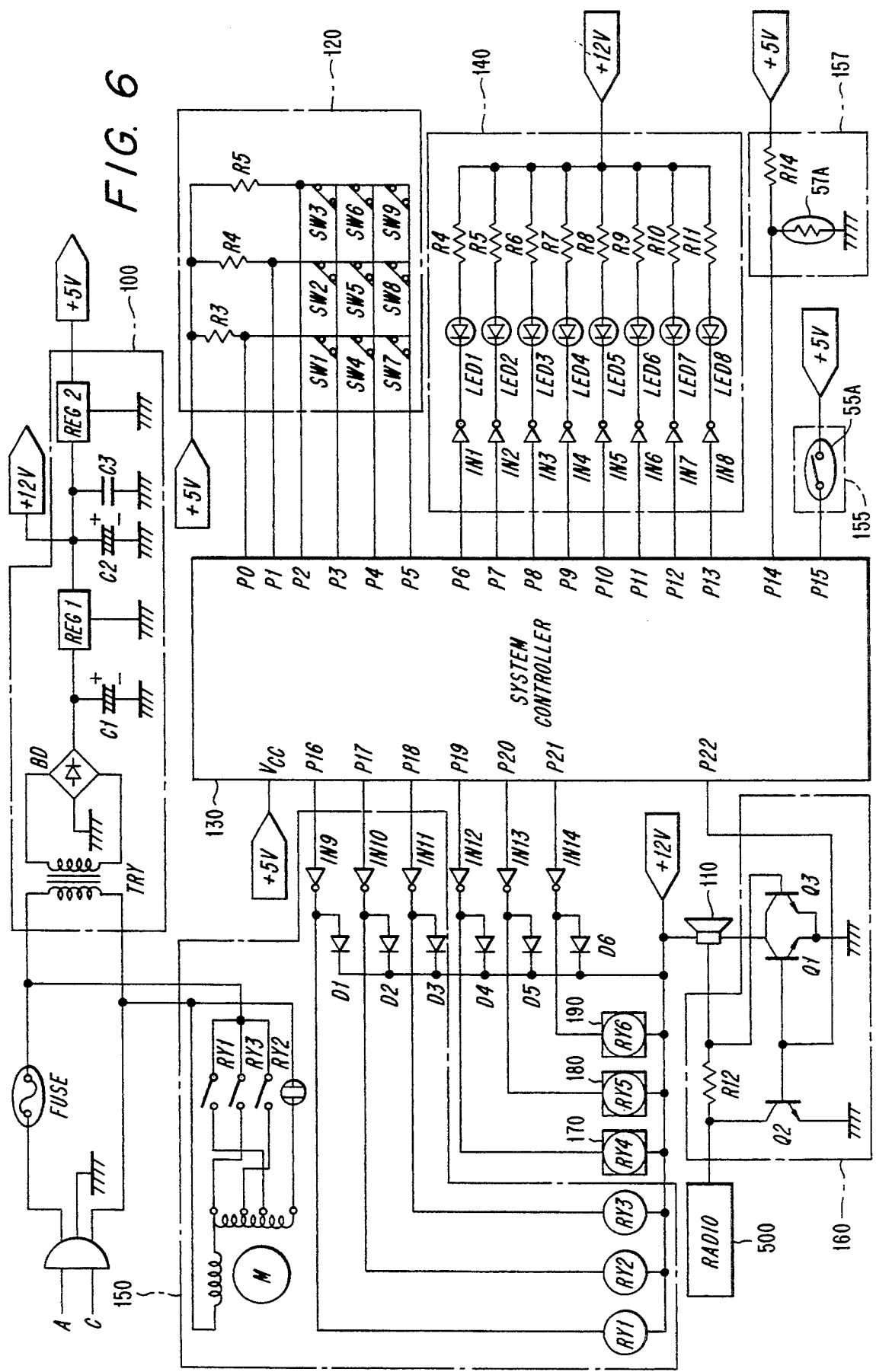
FIG. 6 is a detailed control circuit diagram of a cooling/heating air conditioner in accordance with the present invention.

In the control circuit employed to the cooling/heating air conditioner thus constructed, as illustrated in FIGS. 5 and 6, the system controller 130 is designed to perform an internal program to thereby control peripheral equipment in accordance with a data outputted from the operating means 120 for selecting an operational direction of the system, the water temperature detecting means 157 for selecting the water temperature and quantity within the water tank and an output data of the detecting means 157.

A dispaly means 140 comprises inverters IN1-IN8 and resistors R4-R11 for controlling lightings of Light Emitting Diodes LED1-LED8 for showing the operational directions of the system in accordance with signal levels of signals outputted respectively from output ports P6-P13 of the system controller 130 in order to display the operational directions selected by the operating means 120.

A fan motor drive control means 150 comprises inverters IN9-IN11 for controlling operations of relays RY1, RY2 and RY3 which determine a rotary speed of the fan motor M in accordance with levels of control signal outputted from output ports P16-P18 of the system controller when the water temperature is optimum during selections of high, medium and low wind amount, selections of ventilation and selections of warm airs, and diodes D1-D3 for prevention of reverse voltage.

A water quantity detecting means 150, in accordance with a data outputted from the operating means 120 for selecting an operational state of the system and a data corresponding to the water temperature within the water tank 380, comprises a water quantity detecting sensor 55A installed within the water tank 380 in order to detect the water quantity in the water tank 380 of the cooling/heating airconditioner by way of the system controller 130 for performing the internal programming. Terminals of the sensor 55A are respectively connected to an input/output port P15 of the system controller 130 and to a supply terminal of power source voltage (+5 V). A water temperature detecting means 157 detects temperature variations within the water tank in accordance with a radiation of a heater 440. The water temperature detecting means 157 comprises a temperature detecting sensor 15A, one end of which is connected to an input port P14 of a microprocessor 130 and the other end of which is grounded, and a resistor R14, one end of which is connected to the temperature detecting sensor 157A and to an input port P14 of the microprocessor 130, and the other end of which is connected to a line (+5 V).

A buzzer sound generating means 160 comprises a transistor Q1 for switching a power source supplied to a speaker 110, a transistor Q2 for muting a signal outputted from the radio system 500 in response to the control signal and a transistor Q3 for receiving a signal outputted from the radio 500 through the resistor R1 to thereby generate a sound signal to the speaker 110.

A heat exchange filter driving means 170 comprises an inverter IN12 which, according to an operating state selected by the operating means 120, inversely amplifies a level of a signal outputted from an output port P19 of the system controller 130 in order to heat-exchange the air sucked in through the suction grille unit 230 from the heat exchange filter 370 to cool or warm airs during cooling or heating operations, a relay which is operated by an output signal of the inverter IN12 to thereby supply a driving signal to the heat exchange filter 370 and a diode for preventing an inverse voltage from being supplied to a relay RY4.

A moisture collecting filter driving means 180 comprises a relay RY5 which operates according to a level of a signal outputted from an output port P20 of the system controller if the water quantity is above the predetermined value because a ventilation or a cool air is selected at the operating means 120, and a moisture collecting filter 360 which is actuated driven by the relay RY5.

A heater driving means 190 comprises an inverter IN14 for inversely amplifying a level of a signal outputted from an output port P21 of the system controller if the warm air is selected, the water quantity is adequate and at the same time the water temperature is within an adequate level, a relay RY6 for supplying a power source to the heater 440 by being operated in reaponse to an output signal of the inverter IN14 and a diode D6 for preventing an inverted voltage from being applied to the relay RY6.

An AC/DC converting means 100 comprises a rectifying circuit BD for rectifying AC voltages to DC voltages by being connected to a secondary coil of a transformer TRY, regulators REG1 and REG2 for outputting predetermined respective voltage by being connected to output terminals of the rectifying circuit BD in series and condensers C1 and C2 for removing noises by being connected to the regulators REG1 and REG2, and the voltages outputted from the regulator REG1 are so connected as to be supplied to the radio speaker 110.

An operational relationship of the cooling/heating airconditioner thus constructed will be described in the following.

In FIG. 6, the AC power source is converted to DC voltage through the transformer TRY and the rectifying circuit BD of the AC/DC converting means 100 to thereby be supplied to a couple of regulators REG1 and REG2 which output different output voltages 12 V and 5 V, and the output voltages of the regulators REG1 and REG are respectively supplied to the system controller 130, radio speaker 110 and peripheral equipment.

The system controller 130, under circumstances voltages are supplied to the system controller 130 and peripheral equipment, scans a switch selected at the operating means 120 by scan pulses outputted by input/output ports P0, P1 and P2 to thereby operate the system.

By way of example, if a switch is selected to a "high" corresponding to a "high wind" discharged from the operating means 120, a scanned signal is supplied to the input/output port P3 of the system controller 130 to thereby make "high" signals respectively outputted from the input/output ports P6 and P16.

Because the "high" signals outputted from an input/output port P6 of the system controller 130 are supplied to an inverter IN1 within a display unit 120, a luminous element LED1 is so lighted to display the operating state to the outside.

Furthermore, because "high" signals outputted from an input/output port P16 of the system controller 130 are supplied to an inverter IN9 to thereby operate the relay RY1 of the fan motor driving control means 150, a rotary speed of the fan motor M is determined, so that the discharged air quantity can become "high".

Meanwhile, if the switches SW2 and SW3 of the operating means 120 are selected in order to make the air quantity "medium" or "low", the system controller 130 is operated, as mentioned in the aforesaid, to thereby light the luminous elements LED2 and LED3 of the display unit 140, so that the relays RY2 and RY3 are driven to thereafter keep the rotary speed of the fan motor M under "medium" or "low".

Under the state mentioned in the foregoing or an initialized state, when a ventilation switch SW4 of the operating means 120 is selected, the system controller detects the state thereof to thereby output a "high" signal for controlling the peripheral equipment of input/output ports P7, P10, P17 and P20.

Bacause the "high" signals outputted from ports P7 and P10 of the system controller 130 are supplied to inverters IN2 and IN5 of the display unit 40 to thereby light the luminous elements LED2 and LED5, the air quantity discharged is displayed as "medium" and a moisture collecting filter driving state is displayed to the outside.

Meanwhile, because the "high" signals outputted from ports P17 and P20 of the system controller 130 are supplied to inverters IN10 and IN13, the relay RY2 and the moisture collecting filter actuating driving means 180 of the fan motor actuating control means 150 are activated to thereby rotate the fan motor in a "medium" speed, so that the moisture of the air being blown is removed by the moisture collecting filter.

If a cool air switch SW5 is selected at the operating means 120, the system controller 130 determines whether or not the water quantity detected at the water quantity detecting sensor 55A of the water quantity detecting means 155 is above the predetermined value, by way of example, if the detected water quantity is not above the predetermined value, the system controller 130 outputs a "high" signal to a port P22 to thereby activate transistors Q1 and Q2 of the buzzer sound generating means 160, so that the signal outputted from the radio 500 is muted by the transistor Q2. Accordingly, the transistor Q3 is rendered "off" and the radio speaker 110 is activated by the transistor Q1 to thereby generate only the buzzer sound so that a notice that a water replenishment is needed is advised to the outside.

Meanwhile, if the detected water quantity is above the predetermined value, "high" signals are outputted from ports P10, P13, P19 and P20 of the system controller 130, so that luminous elements LED5 and LED8 of display means 140 for displaying to the outside activations of moisture collecting filter and heat exchange filter are lighted. At the same time, because a heat exchange filter driving means 170 and a moisture collecting filter actuating means 180 are activated, the air sucked into the room is heat-exchanged to "cool" to thereafter be discharged through the moisture colleting filter, being deprived of moisture.

Meanwhile, if a warm air switch SW6 is selected at the operating means 120, the system controller 130, as mentioned in the foregoing, in response to the water quantity outputted from the water quantity detecting means 165, activates the buzzer to indicate that the water tank should be filled with water, and when the supplemented water is above the predetermined value the system controller 130 sends out a "high" signal to a port P12 to thereby light a light emitting element LED7 for displaying to the outside that the heater is driven. And at the same time, because the "high" signal outputted from the port P21 is supplied to a heater driving means 190 through an inverter IN14, the water temperature within the water tank is increased.

As seen in the foregoing, the system controller 130 in the process of the water temperature in the water tank being increased, detects the water temperature within the water tank in accordance with the temperature detecting sensor 57A and pulls into an input detecting means 157 an output signal of the water temperature detecting means 157 for outputting a data corresponding thereof, and compares the same with the reference temperature.

From the foregoing, if the compared result reveals that the water temperature detected from the water temperature detecting means 157 is not within the adequate level, the system controller 130 sends out a control signal corresponding to a halt to output ports P16, P17 and P18 to thereby stop the operation of the fan motor driving control means 150, so that the revolution of the fan motor is halted.

If the water temperature is within the adequate level, the system controller 130 activates the heat exchange filter driving means 170, heater driving means 190 and fan motor driving control means 150 in order to heat-exchange the sucked-in room air to warm air and at the same time signals are sent out to the respective output ports in order to display to the outside whether or not the means 170, 190 and 150 are activated.

As seen from the aforesaid, the system controller 130 discriminates whether or not the water temperature within the water tank detected by the water temperature detecting means 157 is the adequate level and if the water temperature within the water tank is increased by the activation of the heater driving means 190.

Here, if the water temperature detected therefrom is above the adequate level, the system controller 130 reverses the signal outputted from a port P21 from "high" to "low" to thereby supply the same to an inverter IN14, so that the operation of the heater driving means 190 is halted.

If the detected water temperature is below the adequate level, the system controller 130 keeps activating the heater driving means 190 to thereby increase the water temperature within the water tank, so that warm airs are always discharged within a predetermined range during a selection of warm airs.

As seen in the foregoing, in the cooling/heating air conditioner employing a circuit controlling the peripheral equipment, if a fan 280 illustrated in FIGS. 3 and 4 is rotated, the room air is sucked in through a plurality of holes 232 of the suction grille unit 230 by a rotating force of the fan, and the dust and the like floating in the air are inducted into the interior by being filtered through an air filter 240 installed on the back of the suction grille unit 230.

Because the induced room air is guided by the guidances of second, third and fourth guide plates 300, 420 and 460, and passes the heat exchange filter 370 disposed on the lower side of a vertical passage of the first and second guide plates 290 and 300, the same is heat-exchanged to humid cool and warm airs.

Furthermore, the heat-exchanged pass the moisture collecting filter 360 to become humid cool air or warm air thereby be changed to agreeable cool and warm airs, so that the same can be discharged to the outside through the discharge grille unit 220.

At this moment, because the heat-exchange filter 370 is rotated and the lower end of the vertical unit 374 is dipped into the water tank 380 by a driven axis 400, the heat exchange filter 370 which is contacted by the water stored in the water tank 380 is rotated in the direction of an arrow S, so that the room airs which have passed the heat exchange filter 370 become heat-exchanged cool and warm airs.

If the heater 440 disposed on the lower side of the water tank 380 is activated, the water in the water tank 380 is heated by a heat generated from the heater 440 to become a hot water necessary for warm airs to thereby be supplied to the heat exchange filter 370.

Furthermore, if the heater 440 is not activated, a cold water supplied from a detachable water canteen 310 is directly supplied to the heat exchange filter 370, so that a condition to generate cool air can apparently be provided.

Meanwhile, in order to provide water to the water tank within the main frame 200 of the air conditioner the a door 340 disposed on the back side against the upper side of the main frame 200 of the air conditioner is opened and the water canteen is moved and filled. The canteen is then reinserted into the space R so that the valve apparatus 320 engages the unit 292 and becomes opened to discharge water into the water tank 380.

The stored quantity of water within the water tank 380 supplied from the detachable water canteen 310 is detected by the water quantity detecting means 155 mounted on the back of the second guide plate 420 and the water therein is supplied to the system controller illustrated in FIG. 6.

Furthermore, in order to install a radio 500 to one end of the main frame 200 of the air conditioner, firstly, a plug mounted on the radio is made to be connected toward a socket disposed on the lower surface of one end in the main frame of the air conditioner and at the same time, because a fixed groove 480 and a fixed protruder 520 disposed on the upper surface of the main frame 200 of the air conditioner and the radio are connected, the radio 500 is attached to one end of the main frame of the air conditioner. Therefore, if various functions (not coded) provided on the radio 500 are utilized to thereby connect the socket 470 of the main frame 200 of the air conditioner with a plug 510 of the radio 500, a sound signal is sent out through a couple of built-in speakers mounted on the lower surface of the main frame 500 of the air conditioner.

As seen from the foregoing, the cooling/heating air conditioner in accordance with the present invention is equipped with a detecting means for detecting the water temperature within the water tank to thereby control adequately the heater driving during a selection of warm air, so that warm air having temperatures within a predetermined range can always be discharged.

The present invention further comprising a water quantity detecting means within the water tank can predict when to supplement the water from the outside according to a driving or a buzzer driving means operating in response to an output signal of the water quantity detecting means and can obtain an effect of adjusting a humidity according to changing seasons by opeating a moisture collecting filter during a ventilation and a blowing of cool air.

What is claimed is:

1. An air conditioner comprising:
    a housing forming an internal air path extending from an inlet to an outlet;
    a fan for inducing an air flow through said air path from said inlet to said outlet;
    a water-containing tank mounted at a lower side of said housing;
    a heat exchange filter passing across said air path and arranged to be moistened with water from said tank so that air passing through said filter exchanges heat with the water in said filter; and
    a moisture collecting filter disposed in said air path downstream of said second portion of said filter for removing moisture from the air after the air has passed through said filter.

2. An air conditioner according to claim 1 including heating means for adjusting the temperature of water in said tank.

3. An air conditioner according to claim 2 including a speaker mounted in said housing and being connectible to a radio, means for sensing a temperature of water in said tank, and audio-signal generating means connected to said speaker and being controlled by said sensing means for causing said speaker to emit an audio signal when the water temperature is different than a selected value.

4. An air conditioner according to claim 1 including a speaker mounted in said housing and connectible to a radio, means for sensing the volume of water in said tank, and audio-signal generating means connected to said speaker and being controlled by said sensing means for causing said speaker to emit an audio signal when the water volume in said tank is below a selected value.

5. An air conditioner according to claim 1 including guide plates forming said air path, one of said guide plates including a concavity in which a portion of said fan is disposed.

6. An air conditioner according to claim 5, wherein said concavity is disposed below said fan and includes a passage for returning water dripping off said fan back to said tank.

7. An air conditioner according to claim 1, wherein said heat exchange filter comprises a driven endless belt, said belt extending around support rollers some of which are mounted to one of said guide plates and others of which are mounted to another of said guide plates, said belt including a vertical section extending into said water tank and a horizontal portion extending across said air path.

8. An air conditioner according to claim 1 including first and second guide plates forming therebetween a vertical portion of said air path, an additional guide plate being disposed below said vertical portion of said air path and below a portion of said filter and being bent to divert air upwardly toward said filter and said vertical portion of said air path.

9. An air conditioner according to claim 1, wherein said heat exchange filter comprises a driven belt filter, said moisture collecting filter comprising a first actuator for said fan, a second actuator for said endless belt filter, a third actuator for said moisture collecting filter, and a control mechanism comprising operating means for by which a user selects a desired mode of operation, and a controller connected to said operating means and said first, second and third actuators for activating said first, second, and third actuators.

10. An air conditioner according to claim 9 including a heater for heating water in said tank, said controller being connected to said heater for energizing the latter.

11. An air conditioner according to claim 10 including sensing means for sensing the volume and temperature of water in said tank, said sensing means being connected to said controller, and audio-warning signal generating means connected to said controller for emitting an audio warning signal when one of water volume and water temperature varies from respective pre-set volume and temperature valves.

12. An air conditioner according to claim 11 including a speaker mounted in said housing and connectible to a radio, and switching means connected to said controller for muting radio sound from said speaker and instead emitting said audio warning signal when said audio warning signal generating means is activated by said sensing means.

13. An air conditioner according to claim 12, wherein said audio signal generating means is a buzzer.

14. An air conditioner according to claim 9, wherein said first drive means is operable to drive said fan at different selected speeds determined by actuation of air speed switch of said operating means.

* * * * *